United States Patent Office 3,521,428
Patented July 21, 1970

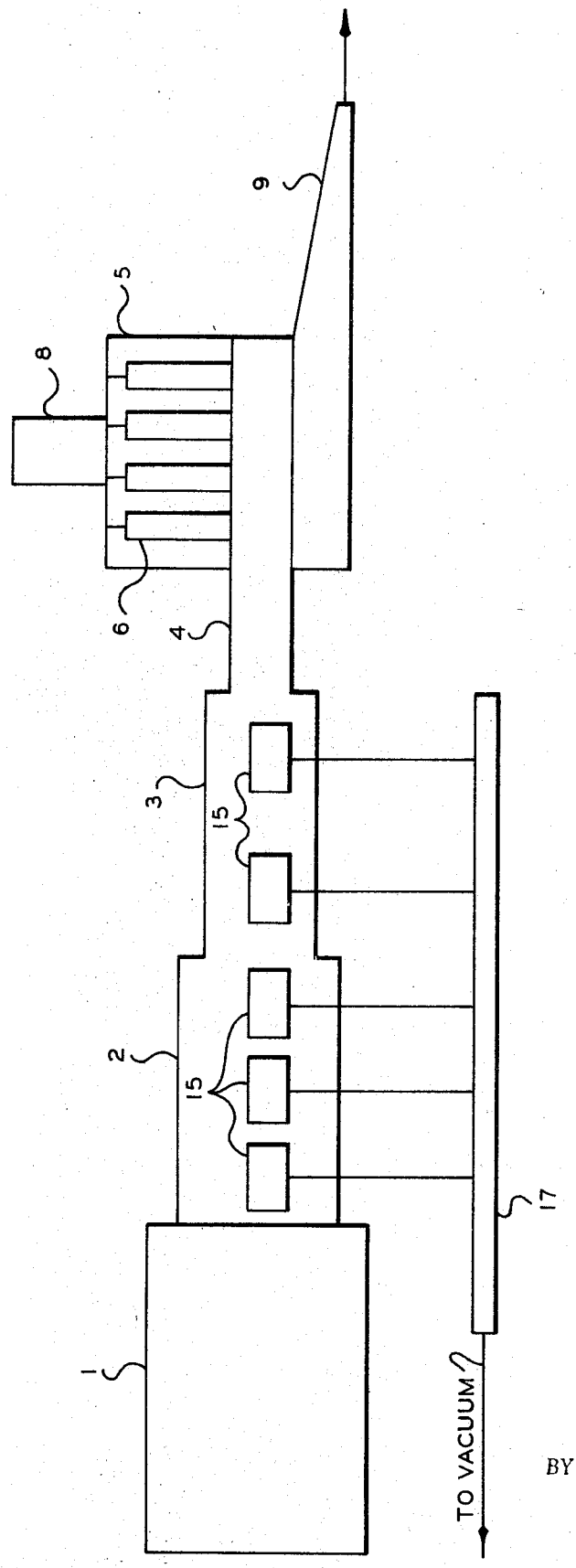

3,521,428
PHASE SEPARATION
Robert E. Dollinger and Robert H. Kallenberger, Phillips, Tex., assignors to Phillips Petroleum Company, a corporation of Delaware
Filed June 20, 1968, Ser. No. 738,617
Int. Cl. B01d 46/04
U.S. Cl. 55—96
5 Claims

ABSTRACT OF THE DISCLOSURE

A method of phase separation involving the removal of a portion of the continuous phase of a system comprising a dispersoid and a continuous phase to increase the concentration of the dispersoid in the continuous phase to a desired level and the subsequent separation of the dispersoid and the continuous phase.

---

This invention relates to a process of phase separation.

In one of its more specific aspects it relates to a process for the separation of the components of a multicomponent system, one of the components being present in the continuous phase.

According to this invention, there is supplied a process for separating a dispersoid from a continuous phase which comprises withdrawing from the mixture a portion of the continuous phase to increase the concentration of the dispersoid in the residual mixture and separating the dispersoid from the continuous phase of the residual mixture.

Accordingly, it is an object of this invention to provide a process for phase separation.

It is another object of this invention to provide a process for the separation of the components of a mixed phase system.

The method of this invention finds wide use in industry, particularly in processes involving, for example, systems of solids suspended in gases, or systems of solids suspended in liquid. Frequently, it is desired to effect a separation between the various phases constituting the system. For example, in a system of a gas containing a quantity of dispersed particulate matter, it may be desired to increase the solids to an optimum concentration in the gas prior to a subsequent separation which is more effectively performed at certain solid concentrations not possessed by the original mixture. Similarly, it may be desired to alter the concentration relationships between the components of the system in those instances where the alteration, which may involve a removal of the continuous phase, will result, for example, in particle size improvement of the material dispersed in the continuous phase.

Further applications of such a process may be desirable in those instances where it is necessary to reduce the overall quantity of the mixture for purposes of economics in respect to line sizing, filtration equipment sizing, or sizing of other processing equipment.

The first separation step involved in the process of this invention may be a continuous or an intermittent one, that is, it may be practiced continuously as the ultimate separation between the dispersoid and the continuous phase is being continuously made, or it may be practiced intermittently, while the ultimate separation is being continuously made. An example of this would be that process involving bag filtering of carbon black from smoke in which unused bag filters are placed in service and it is necessary to precoat the fabric, this precoating being more advantageously carried out by temporarily increasing the concentration of the carbon black in the hot gases to a point above that concentration at which carbon black is normally present in the hot gases.

In this instance, the invention would be carried out temporarily until the precoating of the fabric bags had been accomplished, after which, the ultimate separation alone could be continued at normal concentrations of the black in the smoke.

The present invention is widely applicable to other steps within the process of carbon black production and will be explained in reference to that operation without meaning to limit the invention thereto.

The attached drawing shows one embodiment of the carbon black producing process of this invention in a simplified form. The method is applied to this carbon black process for the purpose of increasing the carbon black concentration in the smoke and simultaneously for decreasing the volume of smoke which must be handled in the system.

Referring now to the attached drawing there is shown generally carbon black furnace 1 in which carbon black is produced as a "smoke," that is, as a mixture comprising principally carbon black particles in combustion gases. This mixture, in which the combustion gases constitute the continuous phase and the carbon black particles constitute the discontinuous phase, leaves the furnace through conduit 2 and is conducted into conduits 3 and 4 into filter unit 5. In filter unit 5, there are situated fabric filter bags 6 by means of which the carbon black is removed from the gases. The combustion gases pass from the system through vent 8 and the carbon black, as occasionally shaken or removed from the bag interior, is recovered from the system through recovery port 9.

In applying the method of this invention, there are installed in conduits 2 and 3, a series of phase separation means which, for the purpose of this example, are illustrated as filters 15. These are connected by series or parallel arrangements through conduit and manifold 17 to vacuum creating means by which gas, the continuous phase, is continuously or intermittently removed from conduits 2 and 3. By proper sizing of conduits 2 and 3, the velocity of the smoke cleans the carbon black particles from the filters, the carbon black particles thereupon being redispersed in the smoke to produce a smoke having a higher carbon black concentration at any point downstream of the filters. Other means may be employed for cleaning the particles from the filters, these including, for example vibratory means acting from outside of the duct work.

While for the purpose of illustration, only five of these filters have been shown, any number can be employed in any section of the conduit. Similarly, these filters can be of any size or shape and manifold 17 can be operated at any feasible pressure level beneath that in duct work 2. It will be appreciated that by the method of this invention, there can be effected in conduit 2 a sufficient reduction in volume of gas so that conduit 3 can be of smaller area than conduit 2 without any appreciable increase in pressure drop through that section as compared to the pressure drop experienced in section 2.

As an alternate to plate type filters 15 shown in conduit sections 2 and 3, any section of the conduit can be composed of a porous tile segment, for example, connected to a manifold and evacuated as previously explained. Porous tile is simply an alternate embodiment and can be used independently or in conjunction with plate filters 15.

It has been determined that by proper spatial relationship between filters and by proper application of vacuums through the manifolds, the filters will be essentially cleaned of carbon black by the velocity of the smoke through the conduits, as previously mentioned. The effect of this cleaning is to redistribute the carbon black in the decreased volume of gases to produce a smoke having a higher concentration of carbon black in the combustion gases.

Other methods will also serve to remove the carbon black from the filters and reinstate it in the smoke; these include vibratory methods, reverse flow methods, back flushing and burning clean by back-flushing with small quantities of a free oxygen-containing gas at a temperature of about 1000° F., to mention a few. While any suitable method can be used, cleaning of the filters of carbon black by employment of suitable smoke velocities has been found to be most practical, being continuous and undiluting of the carbon black smoke.

Velocities through the conduit, as required to remove the dispersoids from the filters, will vary with the application. It has generally been found that in applying this system to carbon black production, smoke velocities of not less than 150 feet per second will be suitable for the sweeping of the filters. For example, if the conduit is sized to provide an inlet smoke velocity of 200 feet per second and, in consideration of the combustion gases removed, the velocity is reduced to about 150 feet per second at a point in the conduit, at that point, the size of the conduit should be decreased to such a diameter as to again result in a smoke velocity greater than about 150 feet per second.

Various shapes and properties of filters can be employed; thin, double-walled filters positioned with the principal faces paralleling the flow of the smoke having been particularly successful, any exterior configuration of the filter generally being satisfactory.

The filter area provided will vary with the process to which the invention is applied. In application to the carbon black process, it is preferred to provide about a minimum of two square feet of effective filter surface per cubic foot of continuous phase removed per minute, measured at standard conditions. For porous stainless steel filters, a suitable area has been found to be from about 2 to about 3 square feet of filter area per standard cubic feet per minute of continuous phase removed. For ceramic or porous alumina filters a similar range has been found effective when applied to the carbon black production process.

As mentioned, any suitable separation means can be employed, stainless steel and ceramic filters being particularly suitable. When employing stainless steel filters in carbon black production, an acceptable range of porosity is from about 5 to about 60 microns, a range of about 30 to about 40 being preferred. When employing ceramic filters, an acceptable range of porosity is from "fine" to "coarse," "medium" being preferred.

One typical example of the invention as applied to a carbon black process involved the following operating conditions.

A carbon black producing process had a reactor effluent of carbon black in hot gas which required about 8,700 square feet of bag type filter area to separate the carbon black from the hot gases.

These hot gases consisted of reaction off gas, water vapor formed in the reaction, and water vapor from reaction quench in percentages of about 67, 7 and 26, respectively, in a total hourly off-gas rate of 418,000 cubic feet measured at standard conditions. The carbon black concentration in these gases was 1500 pounds, bringing the smoke to be handled to 34,700 pounds per hour.

Under the process of this invention, and in an arrangement comparable to that shown in the attached drawing, there were installed in the duct work between the reactor and the bag filters, a quantity of porous stainless steel filters having a total area of 4,350 square feet. These stainless steel filters had a capacity of 2.4 square feet of porous surface per cubic foot of gas measured at standard conditions and were intended to operate at about 80 percent of capacity.

In operation, 209,000 s.c.f.h. of the continuous phase were removed, in effect, doubling the concentration of the dispersed carbon black in the remaining 209,000 s.c.f.h. of continuous phase routed to the bag filters.

While the present invention has been expressed as applied to carbon black production, it is not meant to be so limited. Similarly, while the invention has been limited to a solid dispersoid in a gaseous continuous phase in which certain separation means have been employed, again, it is not to be so limited.

What is claimed is:

1. A process for recovering carbon black from an effluent stream comprising carbon black and gases from a carbon black furnace, comprising passing a first effluent stream comprising carbon black and gases through a conduit having at least one filter positioned within the conduit and supported in spaced relationship from said conduit to provide a flow path in said conduit therebetween, passing said effluent stream into contact with said at least one filter and through the filter and from said conduit to deposit carbon black on said filter, thereafter passing a second effluent stream comprising carbon black and gases through said conduit into contact with said at least one filter and sweeping the carbon black from said at least one filter to thereby increase the concentration of carbon black in said gases and passing said second effluent stream of increased carbon black concentration to a bag filter apparatus filtering said second stream to precoat the bag filter and recovering carbon black.

2. The process as defined in claim 1 in which carbon black is continuously deposited on said at least one filter and is intermittently removed therefrom.

3. The process as defined in claim 1 in which the gases are induced to pass through said at least one filter by application of a vacuum.

4. The method as defined in claim 1 in which the second effluent stream is passed through said conduit at a velocity not less than about 150 feet per second.

5. The method as defined in claim 1 in which said gases of said second effluent stream are passed through said filter bag apparatus and from said conduit at a rate of about one cubic foot per two to three square feet of the at least one filter area per minute.

References Cited

UNITED STATES PATENTS

| | | | |
|---|---|---|---|
| 1,601,148 | 9/1926 | Ruemelin | 55—324 |
| 1,617,071 | 2/1927 | Matlock | 55—341 |
| 1,784,278 | 12/1930 | Dollinger | 55—96 |
| 2,966,232 | 12/1960 | Austin | 55—97 |
| 3,146,080 | 8/1964 | Ruble et al. | 55—97 |
| 3,318,070 | 5/1967 | Zeiss et al. | 55—349 |
| 2,500,851 | 3/1950 | Miller | 55—302 |
| 2,805,732 | 9/1957 | Martinez | 55—304 |
| 2,861,649 | 11/1958 | Junkmann | 55—294 |
| 3,384,460 | 5/1968 | Latham | 23—314 |
| 3,411,929 | 11/1968 | Garrett | 55—341 |

FOREIGN PATENTS 707,684   4/1965   Canada.

FRANK W. LUTTER, Primary Examiner

B. NOZICK, Assistant Examiner

U.S. Cl. X.R.

55—97, 341, 350